(12) United States Patent
Shibayama et al.

(10) Patent No.: US 11,384,694 B2
(45) Date of Patent: Jul. 12, 2022

(54) AUXILIARY DEVICE SYSTEM OF AIRCRAFT ENGINE

(71) Applicant: KAWASAKI JUKOGYO KABUSHIKI KAISHA, Kobe (JP)

(72) Inventors: Yoshiyasu Shibayama, Miki (JP); Tatsuya Okuwa, Kobe (JP); Yoshiaki Yuda, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/279,138

(22) PCT Filed: Sep. 27, 2019

(86) PCT No.: PCT/JP2019/038208
§ 371 (c)(1),
(2) Date: Mar. 24, 2021

(87) PCT Pub. No.: WO2020/067446
PCT Pub. Date: Apr. 2, 2020

(65) Prior Publication Data
US 2021/0396183 A1  Dec. 23, 2021

(30) Foreign Application Priority Data
Sep. 27, 2018  (JP) .............................. JP2018-181597

(51) Int. Cl.
*F02C 7/32*    (2006.01)
*B64D 41/00*   (2006.01)
*F02C 7/275*   (2006.01)

(52) U.S. Cl.
CPC ................ *F02C 7/32* (2013.01); *B64D 41/00* (2013.01); *F02C 7/275* (2013.01);
(Continued)

(58) Field of Classification Search
CPC . F02C 7/32; F02C 7/275; B64D 41/00; F05D 2220/76; F05D 2270/06; F05D 2270/304; Y02T 50/60
(Continued)

(56) References Cited

U.S. PATENT DOCUMENTS

2018/0370619 A1   12/2018  Morioka et al.

FOREIGN PATENT DOCUMENTS

| CN | 107757927 A | * | 3/2018 | |
|---|---|---|---|---|
| EP | 2511220 A1 | * | 10/2012 | ............... B66C 1/08 |
| JP | 2017-100568 A |   | 6/2017 | |

* cited by examiner

*Primary Examiner* — Charles Reid, Jr.
(74) *Attorney, Agent, or Firm* — Sughrue Mion, PLLC

(57) ABSTRACT

An auxiliary device system includes a motor generator, an auxiliary device motor, a converter configured to convert electric power generated by the motor generator, an inverter configured to drive the motor generator and the auxiliary device motor, a switch configured to be switched between a motor generator control state in which the inverter controls the motor generator and an auxiliary device motor control state in which the inverter controls the auxiliary device motor, and a controller configured to control the switch. When a condition in which a motor generator drive command is generated is satisfied, the controller sets the switch to the motor generator control state. When the condition is not satisfied, the controller sets the switch to the auxiliary device motor control state.

7 Claims, 9 Drawing Sheets

(52) U.S. Cl.
CPC ...... *F05D 2220/76* (2013.01); *F05D 2270/06* (2013.01); *F05D 2270/304* (2013.01)

(58) Field of Classification Search
USPC .............................................. 290/52; 322/17
See application file for complete search history.

AUXILIARY DEVICE SYSTEM OF AIRCRAFT ENGINE

CROSS REFERENCE TO RELATED APPLICATIONS

This application is a National Stage of International Application No. PCT/JP2019/038208 filed Sep. 27, 2019, claiming priority based on Japanese Patent Application No. 2018-181597 filed Sep. 27, 2019.

TECHNICAL FIELD

The present invention relates to an auxiliary device system of an aircraft engine.

BACKGROUND ART

Due to the trend of motorizing in recent years, a large number of electric motors tend to be mounted on an aircraft (see PTL 1, for example). An aircraft engine is normally started up by using compressed air. However, as one example of the motorizing, the aircraft engine may be started up by an electric motor generator.

CITATION LIST

Patent Literature

PTL 1: Japanese Laid-Open Patent Application Publication No. 2017-100568

SUMMARY OF INVENTION

Technical Problem

A control unit of the motor generator may have both an inverter function which utilizes the motor generator as an actuator and a converter function which utilizes the motor generator as a power generator. However, there is a problem that the control unit having the inverter function and the converter function increases in size due to an increase in the amount of electric power, and therefore, increases in weight.

An object of the present invention is to, while providing a motor generator at an aircraft engine, reduce the size of a device configured to control the motor generator, to suppress an increase in weight of the device.

Solution to Problem

An auxiliary device system of an aircraft engine according to one aspect of the present invention includes: a motor generator configured to drive an aircraft engine; an auxiliary device motor configured to drive an auxiliary device mounted on the aircraft engine; a converter configured to convert electric power generated by the motor generator; an inverter provided separately from the converter and configured to drive the motor generator and the auxiliary device motor; a switch configured to be switched between a motor generator control state in which the inverter controls the motor generator and an auxiliary device motor control state in which the inverter controls the auxiliary device motor; and a controller configured to control the switch. When a condition in which a motor generator drive command has been generated is satisfied, the controller sets the switch to the motor generator control state. When the condition is not satisfied, the controller sets the switch to the auxiliary device motor control state.

According to the above configuration, since the converter is provided separately from the inverter, the converter may be made smaller than a control unit having both an inverter function and a converter function. Then, a target driven by the inverter is switchable, and the inverter which drives the auxiliary device motor is also utilized as the inverter which drives the motor generator. Therefore, it is unnecessary to provide an inverter dedicated for the motor generator. On this account, while providing the motor generator at the aircraft engine, an entire device configured to control the motor generator can be reduced in size, and an increase in weight of the device can be suppressed.

When a rotational frequency of the aircraft engine is less than a predetermined rotational frequency threshold, the controller may generate the motor generator drive command.

According to the above configuration, when the engine rotational frequency is low, the engine is driven by the motor generator. On the other hand, when the engine rotational frequency increases, and the driving of the engine by the motor generator becomes unnecessary, the inverter is utilized to drive the auxiliary device motor. With this, the inverter can be efficiently shared.

The auxiliary device motor may be a pump driving motor configured to drive a fuel supply pump of the aircraft engine. The rotational frequency threshold may be set to a value larger than a predetermined ignition rotational frequency of the aircraft engine.

According to the above configuration, after the rotational frequency of the aircraft engine reaches the rotational frequency threshold that is a value larger than the ignition rotational frequency, the switch is switched from the motor generator control state to the auxiliary device motor control state to supply fuel to the engine. Therefore, even when the rotational frequency of the aircraft engine decreases since the motor generator does not operate in a period from when the auxiliary device motor control state is started until when ignition is completed, the engine rotational frequency can be prevented from falling under the ignition rotational frequency at the time of the ignition.

The auxiliary device motor may be a pump driving motor configured to drive a fuel supply pump of the aircraft engine. The switch may be configured to be switched to a simultaneous control state in which the inverter controls both the motor generator and the pump driving motor. When the rotational frequency of the aircraft engine is less than the rotational frequency threshold, the controller may set the switch to the motor generator control state. When the rotational frequency of the aircraft engine reaches the rotational frequency threshold, the controller may switch the switch from the motor generator control state to the simultaneous control state. After a predetermined switching condition is satisfied, the controller may switch the switch from the simultaneous control state to the auxiliary device motor control state.

According to the above configuration, in a period from when the rotational frequency of the aircraft engine has reached the rotational frequency threshold until when the ignition is completed, fuel supply is performed by the pump driving motor while maintaining a state in which the aircraft engine is driven by the motor generator. Therefore, the rotational frequency of the aircraft engine is prevented from decreasing in a period from when the auxiliary device motor control state is started until when the ignition is performed.

On this account, the rotational frequency threshold does not have to be set to a value larger than the ignition rotational frequency, and a time it takes for the aircraft engine to reach the idling rotational frequency can be prevented from becoming long.

The at least one auxiliary device motor may include first and second pump driving motors configured to respectively drive first and second fuel supply pumps of the aircraft engine. The at least one inverter may include first and second inverters configured to respectively drive the first and second pump driving motors. The at least one switch may include a first switch interposed between the first inverter and the first pump driving motor and a second switch interposed between the second inverter and the second pump driving motor. When the rotational frequency of the aircraft engine is less than the rotational frequency threshold, the controller may set the first and second switches to the motor generator control state. When the rotational frequency of the aircraft engine reaches the rotational frequency threshold, the controller may maintain the motor generator control state of the second switch and switch the first switch from the motor generator control state to the auxiliary device motor control state. After a predetermined switching condition is satisfied, the controller may maintain the auxiliary device motor control state of the first switch and switch the second switch from the motor generator control state to the auxiliary device motor control state.

According to the above configuration, in a period from when the rotational frequency of the aircraft engine has reached the rotational frequency threshold until when the ignition is completed, the fuel supply is performed by the first pump driving motor while maintaining a state in which the aircraft engine is driven by the motor generator. Therefore, the rotational frequency of the aircraft engine is prevented from decreasing in a period from when the rotational frequency threshold has reached the engine rotational frequency until when the ignition is performed. On this account, the rotational frequency threshold does not have to be set to a value larger than the ignition rotational frequency, and a time it takes for the aircraft engine to reach the idling rotational frequency can be prevented from becoming long.

The switching condition may be a condition in which the rotational frequency of the aircraft engine has reached a predetermined self-sustaining rotation threshold.

According to the above configuration, even after the ignition of the engine, the rotation of the engine is continuously driven by the motor generator, and therefore, the engine rotational frequency is increased to the self-sustaining rotation threshold. Thus, the engine can stably reach the idling rotational frequency.

The controller may generate the motor generator drive command in a period from when the aircraft engine is in a stop state until when the rotational frequency of the aircraft engine reaches the rotational frequency threshold.

According to the above configuration, when starting up the engine, the engine is driven by the motor generator. On the other hand, when the driving of the engine by the motor generator becomes unnecessary at the time of the start-up of the engine, the inverter is utilized to drive the auxiliary device motor. Thus, the inverter can be efficiently shared.

Advantageous Effects of Invention

According to the present invention, while providing the motor generator at the aircraft engine, the device configured to control the motor generator can be reduced in size, and the increase in weight of the device can be suppressed.

DESCRIPTION OF EMBODIMENTS

Hereinafter, embodiments will be described with reference to the drawings.

Embodiment 1

Figure 1:
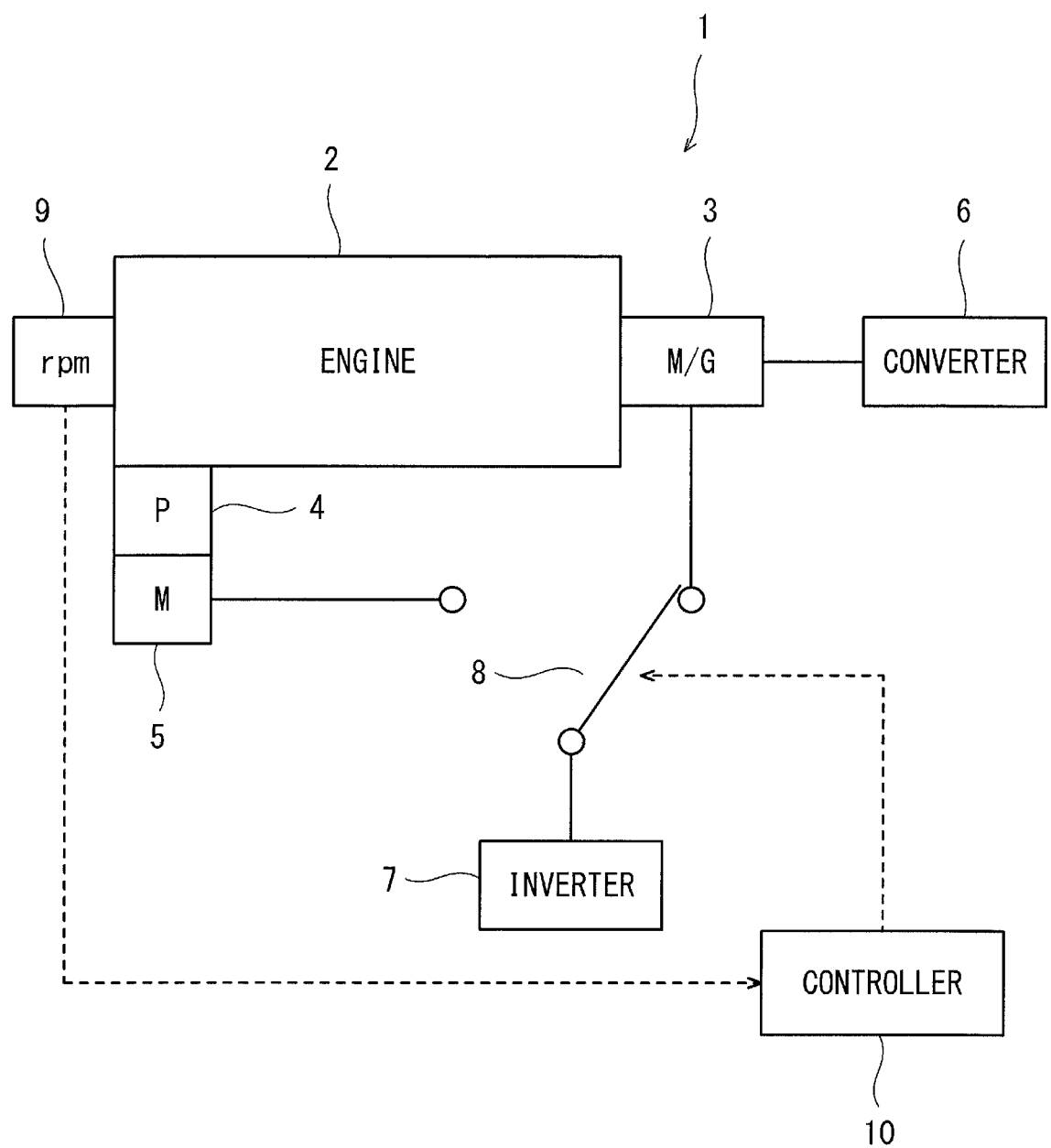
FIG. 1 is a block diagram showing an auxiliary device system of an aircraft engine according to Embodiment 1.

FIG. 1 is a block diagram showing an auxiliary device system of an aircraft engine according to Embodiment 1. As shown in FIG. 1, an auxiliary device system 1 of the aircraft engine includes an engine 2, a motor generator 3, a fuel supply pump 4 (auxiliary device), a pump driving motor 5 (auxiliary device motor), a converter 6, an inverter 7, a switch 8, an engine rotational frequency sensor 9, and a controller 10.

The engine 2 is a gas turbine engine of an aircraft. The motor generator 3 serves as: a starter motor which applies rotational power to an engine rotating shaft to drive the engine 2 when starting up the engine 2; and an assist motor which drives the engine 2 to assist the rotation of the engine 2 which is operating. Moreover, the motor generator 3 also serves as a power generator which generates electric power by using the rotational power of the engine 2 that is operating after being started up. The fuel supply pump 4 is a pump configured to supply combustion fuel to the engine 2. To be specific, the fuel supply pump 4 is one example of an auxiliary device mounted on the engine 2. The pump driving motor 5 is an actuator configured to operate the fuel supply pump 4. To be specific, the pump driving motor 5 is one example of an auxiliary device motor. It should be noted that the auxiliary device driven by the inverter 7 may be an auxiliary device other than the pump driving motor 5, or a plurality of auxiliary devices may be driven by the inverter 7.

The converter 6 converts electric power generated by the motor generator 3, from AC to DC. The inverter 7 drives the motor generator 3 and the pump driving motor 5 and converts DC of a power supply (not shown) into AC. In the present embodiment, the converter 6 and the inverter 7 are provided separately from each other, i.e., provided as separate devices. A circuit through which current of the converter 6 flows and a circuit through which current of the inverter 7 flows are different from each other.

The switch 8 is selectively switched between a motor generator control state (M/G control) in which the inverter 7 controls the motor generator 3 and a pump motor control state (P/M control) in which the inverter 7 controls the pump driving motor 5. The engine rotational frequency sensor 9 is a sensor configured to detect the rotational frequency of the rotating shaft of the engine 2.

When a condition in which a motor generator drive command has been generated is satisfied, the controller 10 realizes the motor generator control state in which the switch 8 is connected to the motor generator 3 side. When the condition is not satisfied, the controller 10 realizes the pump motor control state (auxiliary device motor control state) in which the switch 8 is connected to the pump driving motor 5 side. Herein, the inverter 7 may drive only the motor generator 3 in the motor generator control state and may drive only the pump driving motor 5 in the pump motor control state. When the engine rotational frequency detected by the engine rotational frequency sensor 9 is less than a predetermined value, the controller 10 generates the motor generator drive command. For example, the controller 10 generates the motor generator drive command in a start-up initial period that is a period from when the engine 2 is in a stop state until when the engine rotational frequency reaches a predetermined rotational frequency threshold $R_{TH}$.

Figure 2:
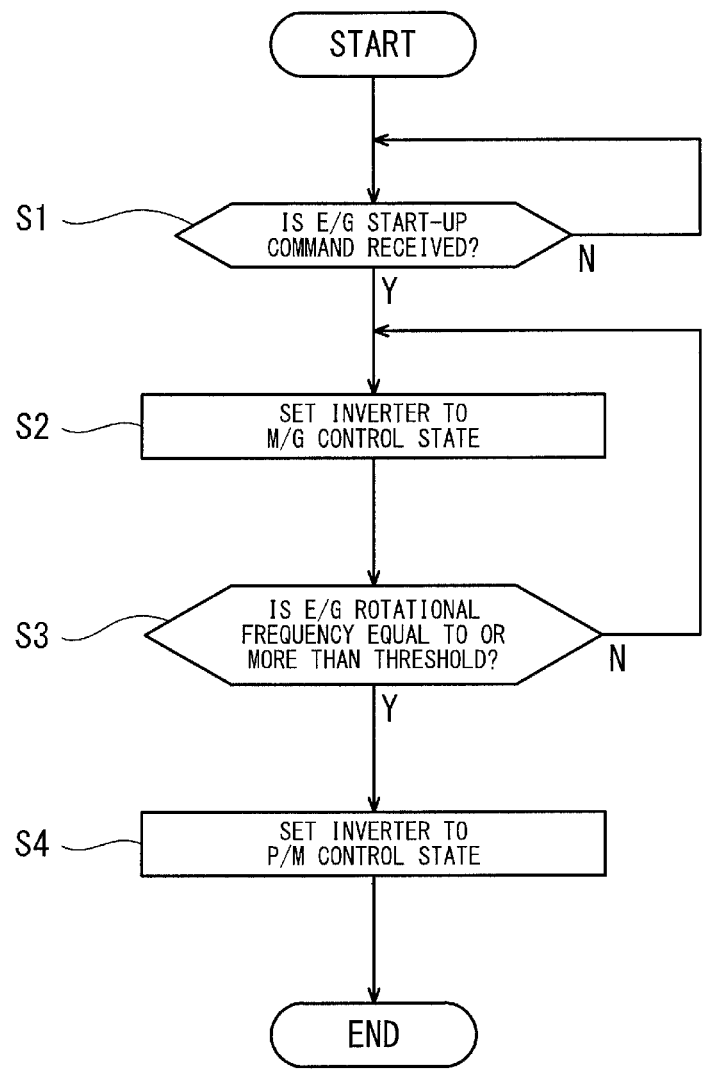
FIG. 2 is a flowchart for explaining control of the auxiliary device system shown in FIG. 1.
Figure 3:
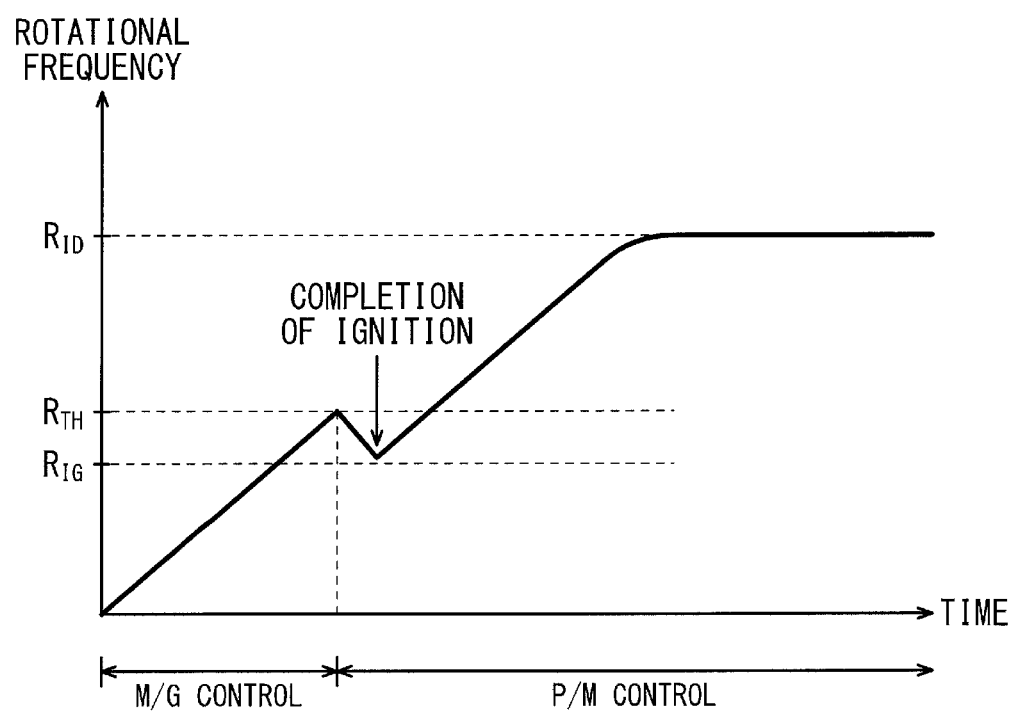
FIG. 3 is a graph showing a temporal change of an engine rotational frequency in the control shown in FIG. 2.

FIG. 2 is a flowchart for explaining the control of the auxiliary device system 1 shown in FIG. 1. FIG. 3 is a graph showing a temporal change of the engine rotational frequency in the control shown in FIG. 2. Hereinafter, the flow in FIG. 2 will be described suitably with reference to FIGS. 1 and 3. First, the controller 10 determines whether or not the controller 10 has received an engine start-up command when the engine 2 is in a stop state (Step S1). The engine start-up command is generated by manipulation of a pilot of the aircraft. When the controller 10 has received the engine start-up command (Yes in Step S1), the controller 10 generates the motor generator drive command and sets the switch 8 to the motor generator control state to drive the motor generator 3 by the inverter 7 (Step S2).

Next, the controller 10 determines whether or not the engine rotational frequency detected by the engine rotational frequency sensor 9 is a rotational frequency threshold $R_{TH}$ or more (Step S3). Herein, the rotational frequency threshold $R_{TH}$ is set to a value larger than a predetermined ignition rotational frequency $R_{IG}$ of the engine 2. The ignition rotational frequency $R_{TH}$ is a value determined in accordance with the specification of the engine as a rotational frequency lower limit by which the engine 2 can combust the fuel from the fuel supply pump 4 without the driving force of the motor generator 3.

When it is determined that the engine rotational frequency is less than the rotational frequency threshold $R_{TH}$ (No in Step S3), the controller 10 maintains the motor generator control state of the switch 8 (Step S2). In contrast, when it is determined that the engine rotational frequency is the rotational frequency threshold $R_{TH}$ or more (Yes in Step S3), the controller 10 stops the motor generator drive command and switches the switch 8 to the pump motor control state to drive the pump driving motor 5 by the inverter 7 (Step S4).

At this time, after the rotational frequency of the engine 2 reaches the rotational frequency threshold $R_{TH}$ that is a value larger than the ignition rotational frequency $R_{IG}$, the switch 8 is switched from the motor generator control state to the pump motor control state. Therefore, even when the engine rotational frequency decreases since the motor generator 3 does not operate in a period from when the pump motor control state is started until when ignition is completed, the engine rotational frequency can be prevented from falling under the ignition rotational frequency $R_{IG}$ at the time of the ignition. Then, by the combustion of the engine 2, the engine rotational frequency increases to reach an idling rotational frequency $R_{ID}$.

According to the above-described configuration, since the converter 6 is provided separately from the inverter 7, the converter 6 may be made smaller than a control unit including both an inverter function and a converter function. For example, a unit (inverter-converter) having both the inverter function and the converter function is mainly constituted by switching semiconductor elements in many cases. However, when a unit has only the converter function, a circuit configuration of the unit can be constituted by another circuit, such as a full-wave rectification circuit or a DC-DC conversion circuit, and the converter can be made smaller than the inverter-converter.

Then, a target to be driven by the inverter 7 is switchable, and the inverter 7 which drives the pump driving motor 5 is also utilized as the inverter 7 which drives the motor generator 3. Therefore, it is unnecessary to provide an inverter dedicated for the motor generator. On this account, while providing the motor generator 3 at the engine 2, an entire device configured to control the motor generator 3 can be reduced in size, and an increase in weight of the device can be suppressed.

Moreover, when the engine rotational frequency is low, the engine 2 is driven by the motor generator 3. On the other hand, when the engine rotational frequency increases, and the driving of the engine 2 by the motor generator 3 becomes unnecessary, the inverter 7 is utilized to drive the pump driving motor 5. With this, the inverter 7 can be efficiently shared.

It should be noted that the controller 10 sets the switch 8 to the motor generator control state when starting up the engine 2. However, the same control may be performed when the engine 2 is operating. A specific example may be such that: when the engine misfires, and the engine rotational frequency becomes less than a predetermined value, the motor generator drive command is generated, and the switch 8 is switched from the pump motor control state to the motor generator control state; when the engine rotational frequency becomes the predetermined value or more again, the motor generator drive command is stopped, and the switch 8 is switched from the motor generator control state to the pump motor control state; and the ignition is performed again.

Embodiment 2

Figure 4:
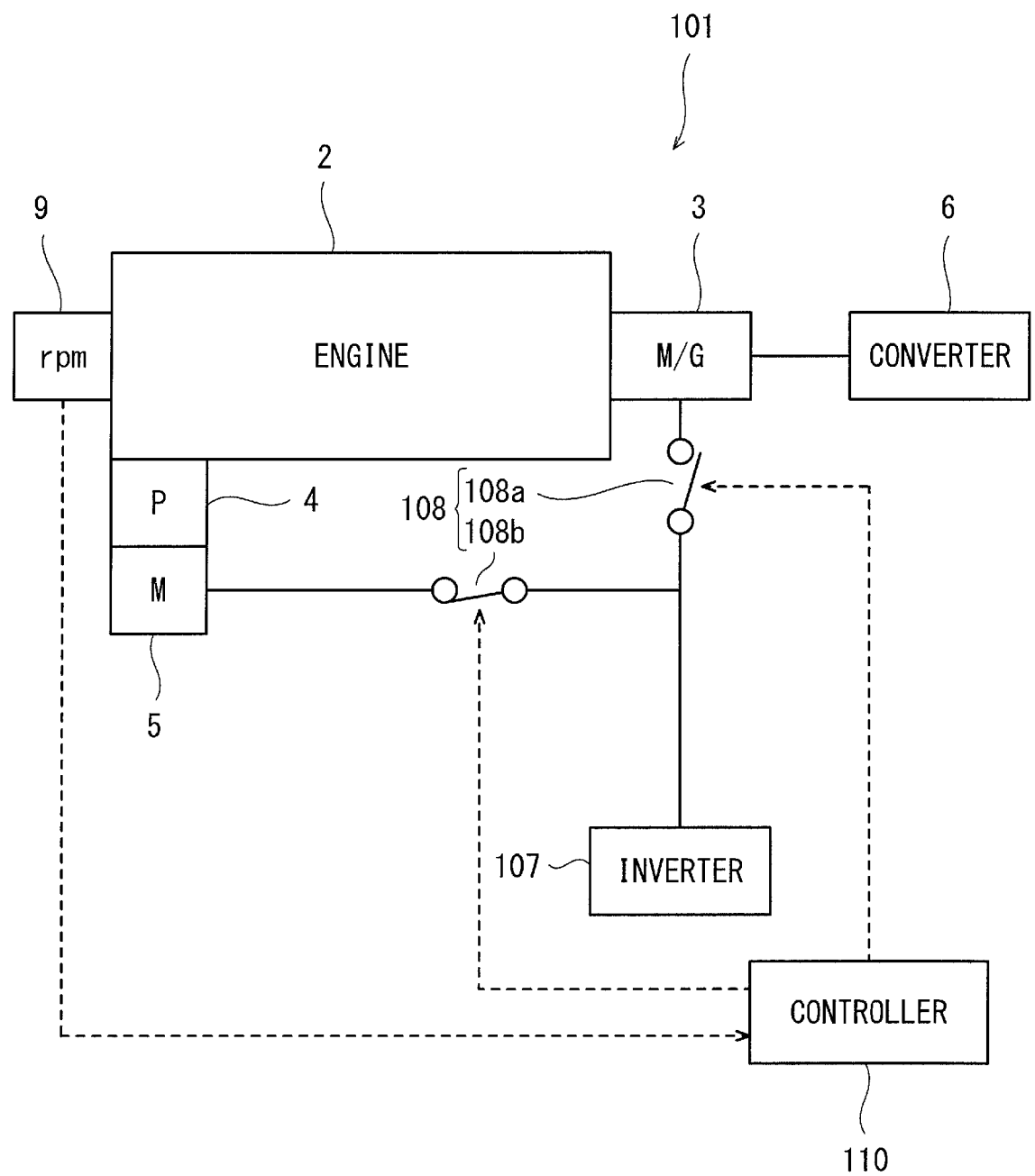
FIG. 4 is a block diagram showing the auxiliary device system of the aircraft engine according to Embodiment 2.

FIG. 4 is a block diagram showing an auxiliary device system 101 of an aircraft engine according to Embodiment 2. It should be noted that the same reference signs are used for the same components as in Embodiment 1, and detailed explanations thereof are omitted. As shown in FIG. 4, the auxiliary device system 101 of Embodiment 2 includes the engine 2, the motor generator 3, the fuel supply pump 4 (auxiliary device), the pump driving motor 5 (auxiliary device motor), the converter 6, an inverter 107, a switch 108, the engine rotational frequency sensor 9, and a controller 110.

The inverter 107 can superpose currents, by which a plurality of motors are respectively driven, on each other to simultaneously drive the plurality of motors. The switch 108 is selectively switched among a motor generator control state (M/G control) in which the inverter 107 controls the motor generator 3, a pump motor control state (P/M control)

in which the inverter 107 controls the pump driving motor 5, and a simultaneous control state in which the inverter 107 controls both the motor generator 3 and the pump driving motor 5. Specifically, the switch 108 includes a first switch 108a and a second switch 108b. The first switch 108a is interposed on a circuit which connects the inverter 107 to the motor generator 3. The second switch 108b is interposed on a circuit which connects the inverter 107 to the pump driving motor 5.

In a period from when the engine 2 is in a stop state until when the engine rotational frequency reaches the rotational frequency threshold (i.e., the ignition rotational frequency $R_{IG}$), the controller 110 maintains an open state of the second switch 108b and closes the first switch 108a to realize the motor generator control state in which the inverter 7 drives only the motor generator 3. When the engine rotational frequency reaches the rotational frequency threshold (i.e., the ignition rotational frequency $R_{IG}$), the controller 110 maintains the closed state of the first switch 108a and closes the second switch 108b to realize the simultaneous control state in which the inverter 107 drives both the motor generator 3 and the pump driving motor 5. When the ignition of the engine 2 is completed, the controller 110 maintains the closed state of the second switch 108b and opens the first switch 108a to realize the pump motor control state in which the inverter 107 drives only the pump driving motor 5.

Figure 5:
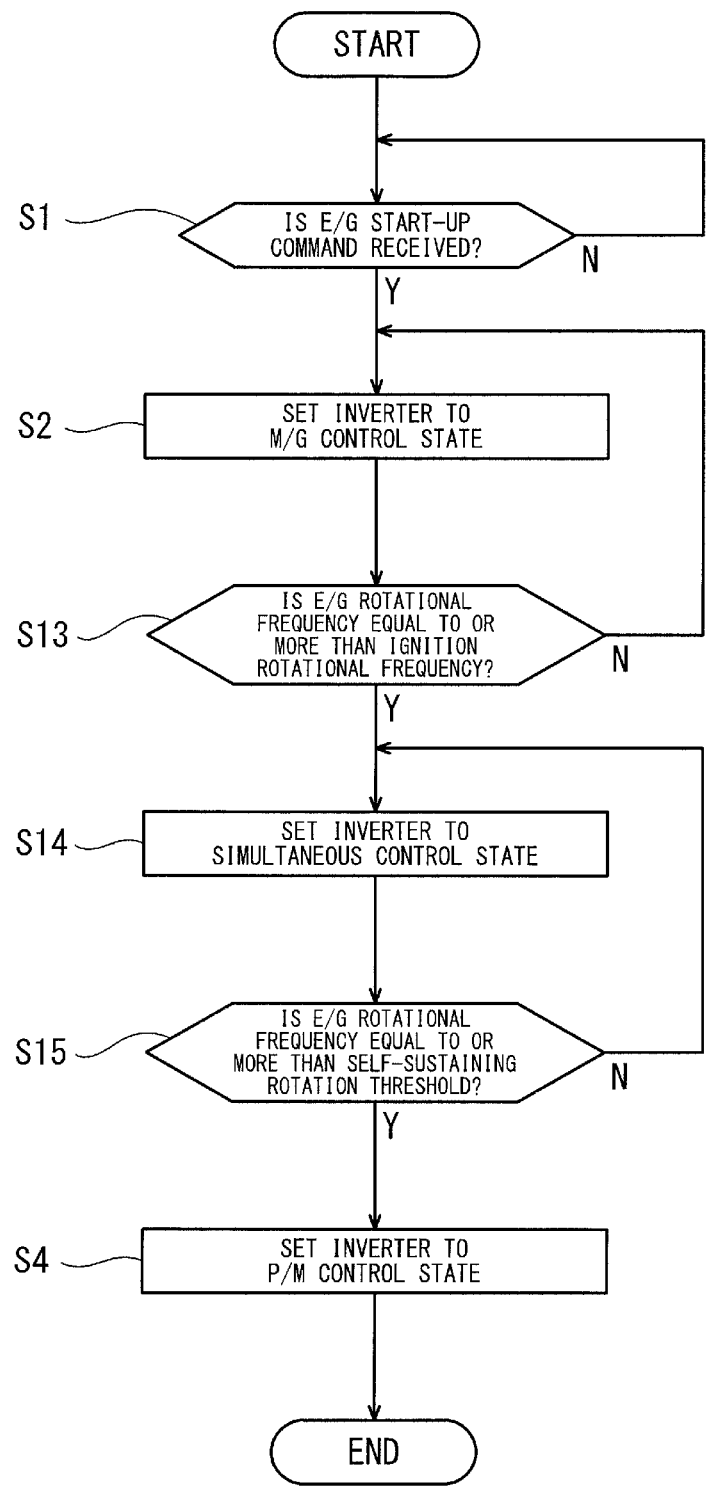
FIG. 5 is a flowchart for explaining the control of the auxiliary device system shown in FIG. 4.
Figure 6:
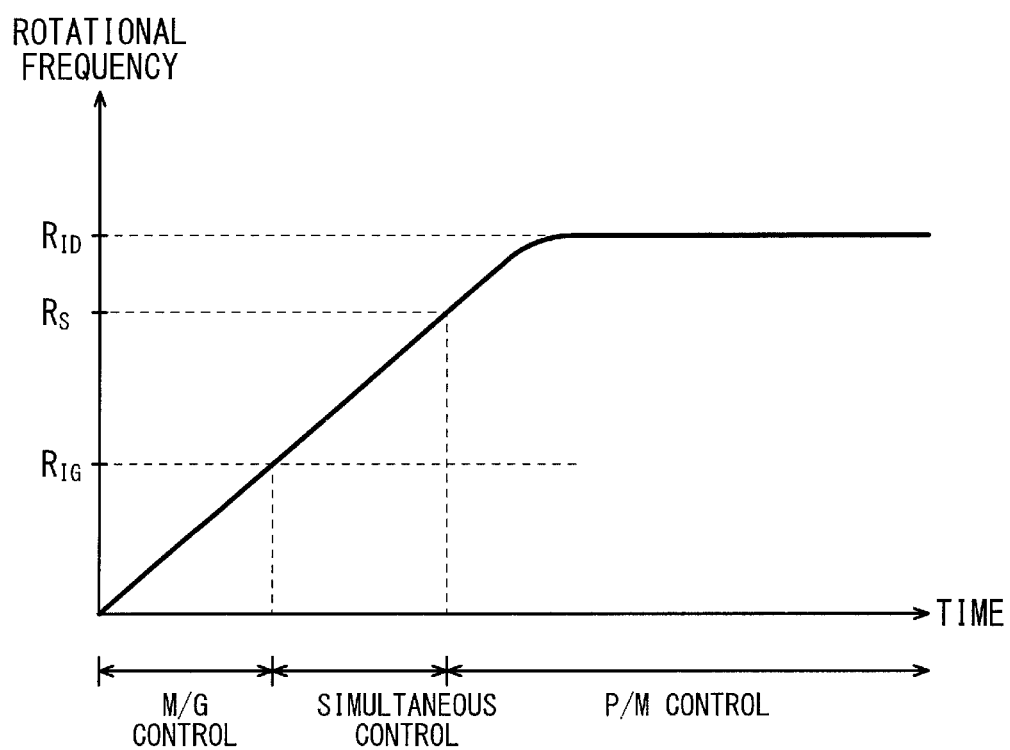
FIG. 6 is a graph showing the temporal change of the engine rotational frequency in the control shown in FIG. 5.

FIG. 5 is a flowchart for explaining the control of the auxiliary device system 101 shown in FIG. 4. FIG. 6 is a graph showing a temporal change of the engine rotational frequency in the control shown in FIG. 5. Hereinafter, the flow in FIG. 5 will be described suitably with reference to FIGS. 4 and 6. Steps S1, S2, and S4 are the same as those of Embodiment 1. The controller 110 determines whether or not the engine rotational frequency is the ignition rotational frequency $R_{IG}$ (i.e., rotational frequency threshold) or more in a state in which only the motor generator 3 is driven (Step S13).

When it is determined that the engine rotational frequency is less than the ignition rotational frequency $R_{IG}$ (No in Step S13), the controller 110 maintains the motor generator control state of the switch 108 (Step S2). In contrast, when it is determined that the engine rotational frequency is the ignition rotational frequency $R_{IG}$ or more (Yes in Step S13), the controller 110 switches the switch 108 to the simultaneous control state, and therefore, the inverter 7 drives both the motor generator 3 and the pump driving motor 5 (Step S14).

Next, the controller 110 determines whether or not a predetermined switching condition is satisfied (Step S15). Specifically, the controller 110 determines whether or not the engine rotational frequency is a predetermined self-sustaining rotation threshold $R_S$ or more after the engine 2 is ignited by the fuel supplied from the fuel supply pump 4, and the engine rotational frequency increases (Step S15). It should be noted that the self-sustaining rotation threshold $R_S$ is set such that the engine 2 cannot stably reach the idling rotational frequency if the engine rotational frequency does not adequately increase and does not reach the self-sustaining rotation threshold $R_S$ due to, for example, mechanical resistance of the engine 2 even when the engine 2 is ignited. To be specific, in order that the engine rotational frequency stably reaches the idling rotational frequency $R_{ID}$, the engine rotational frequency needs to reach the ignition rotational frequency $R_{IG}$ or more and then further reach the self-sustaining rotation threshold $R_S$ or more.

In the present embodiment, the self-sustaining rotation threshold $R_S$ is set to a value between the ignition rotational frequency $R_{IG}$ and the idling rotational frequency $R_{ID}$ but does not have to be set to such value. To be specific, when simultaneous control in which the inverter 107 controls both the motor generator 3 and the pump driving motor 5 is allowed to be performed for a long period of time, and that the engine rotational frequency surely reaches the idling rotational frequency is regarded as important, the self-sustaining rotation threshold $R_S$ may be set to the idling rotational frequency $R_{ID}$ or more.

When it is determined that the engine rotational frequency is not the self-sustaining rotation threshold $R_S$ or more (No in Step S15), the controller 110 maintains the simultaneous control state (Step S14). In contrast, when it is determined that the engine rotational frequency is the self-sustaining rotation threshold $R_S$ or more (Yes in Step S15), the controller 110 switches the switch 108 to the pump motor control state to drive only the pump driving motor 5 by the inverter 107 (Step S4).

According to the above configuration, in a period from when the engine rotational frequency has reached the rotational frequency threshold (i.e., the ignition rotational frequency $R_{IG}$) until when the ignition is completed, fuel supply is performed by the pump driving motor 5 while maintaining a state in which the engine 2 is driven by the motor generator 3. Therefore, the engine rotational frequency is prevented from decreasing in a period from when the pump motor control state is started until when the ignition is completed. On this account, the rotational frequency threshold does not have to be set to a value larger than the ignition rotational frequency $R_{IG}$, and a time it takes to start up the engine 2 can be prevented from becoming long.

Moreover, when the simultaneous control of driving both the motor generator 3 the pump driving motor 5 is continued even after the ignition of the engine, the rotation of the engine 2 can be continuously driven by the motor generator 3, and therefore, the engine rotational frequency can be increased to the self-sustaining rotation threshold $R_S$. Thus, the engine 2 can stably reach the idling rotational frequency.

It should be noted that Step S15 in which it is determined whether or not the engine rotational frequency is the predetermined self-sustaining rotation threshold $R_S$ or more is optional. For example, the switching condition in Step S15 may be a condition in which an increase rate of the engine rotational frequency has increased from an immediately preceding increase rate by more than a predetermined value. Moreover, the switching condition may be a condition in which a predetermined time has elapsed since the start of the driving of the pump driving motor 5. Furthermore, the switching condition may be a condition in which the ignition of the engine 2 has been completed. To be specific, the switching condition may be any condition as long as the switch 108 is finally switched from the simultaneous control state to the pump motor control state. Moreover, in the example of FIG. 6, the rotational frequency threshold in Step S13 is set to be the same as the ignition rotational frequency $R_{IG}$. However, the rotational frequency threshold may be set to a value slightly larger than the ignition rotational frequency $R_{IG}$.

Embodiment 3

Figure 7:
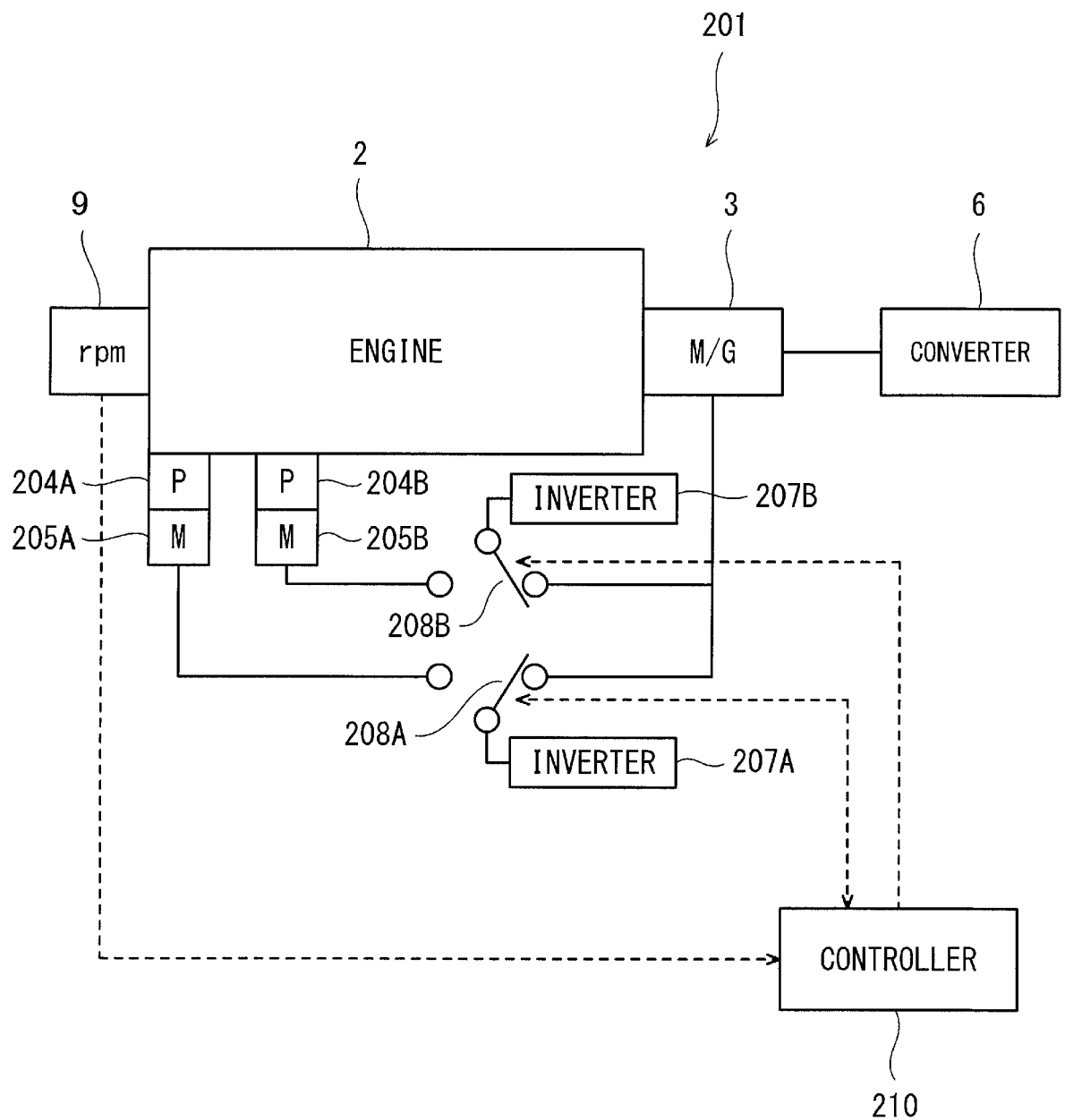
FIG. 7 is a block diagram showing the auxiliary device system of the aircraft engine according to Embodiment 3.

FIG. 7 is a block diagram showing an auxiliary device system 201 of an aircraft engine according to Embodiment 3. The same reference signs are used for the same components as in Embodiment 1, and detailed explanations thereof are omitted. As shown in FIG. 7, the auxiliary device system 201 of Embodiment 3 includes the engine 2, the motor generator 3, a first fuel supply pump 204A (auxiliary device), a second fuel supply pump 204B, a first pump driving motor 205A (auxiliary device motor), a second pump driving motor 205B (auxiliary device motor), the converter 6, a first inverter 207A, a second inverter 207B, a first switch 208A, a second switch 208B, the engine rotational frequency sensor 9, and a controller 210.

The first fuel supply pump 204A and the second fuel supply pump 204B supply the fuel to the engine 2. The first pump driving motor 205A and the second pump driving motor 205B drive the first fuel supply pump 204A and the second fuel supply pump 204B, respectively. The first inverter 207A and the second inverter 207B can control the first pump driving motor 205A and the second pump driving motor 205B, respectively, and can also control the motor generator 3.

The first switch 208A is selectively switched between a motor generator control state (M/G control) in which the first inverter 207A controls the motor generator 3 and a pump motor control state (P/M control) in which the first inverter 207A controls the first pump driving motor 205A. The second switch 208B is selectively switched between a motor generator control state (M/G control) in which the second inverter 207B controls the motor generator 3 and a pump motor control state (P/M control) in which the second inverter 207B controls the second pump driving motor 205B.

In a period from when the engine 2 is in a stop state until when the engine rotational frequency reaches the rotational frequency threshold (i.e., the ignition rotational frequency $R_{IG}$), the controller 210 sets the first and second switches 208A and 208B to the motor generator control state (M/G control). When the engine rotational frequency reaches the rotational frequency threshold (i.e., the ignition rotational frequency $R_{IG}$), the controller 210 maintains the motor generator control state of the second switch 208B and switches the first switch 208A to the pump motor control state (P/M control). When the ignition of the engine 2 is completed, the controller 210 maintains the pump motor control state of the first switch 208A and the motor generator control state of the second switch 208B and switches the first switch 208A to the pump motor control state.

Figure 8:
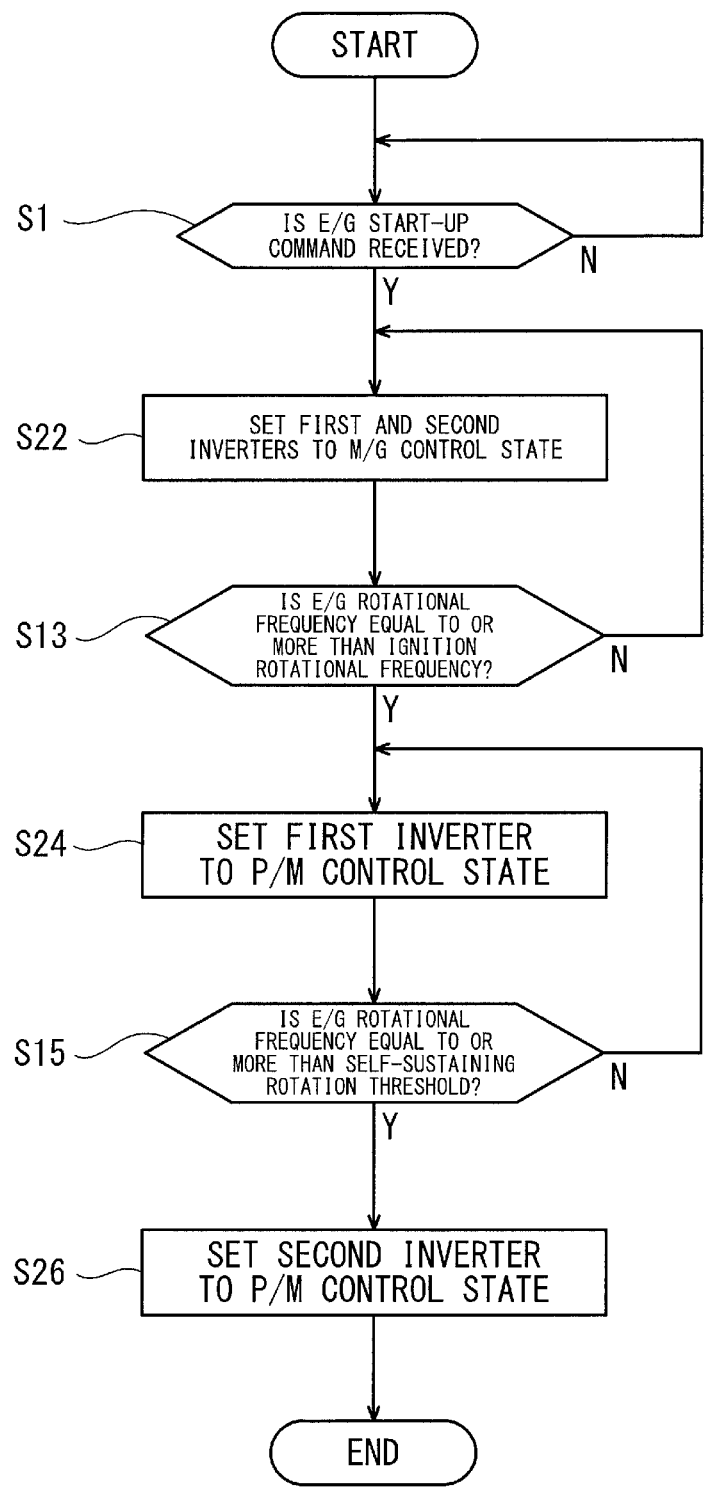
FIG. 8 is a flowchart for explaining the control of the auxiliary device system shown in FIG. 7.
Figure 9:
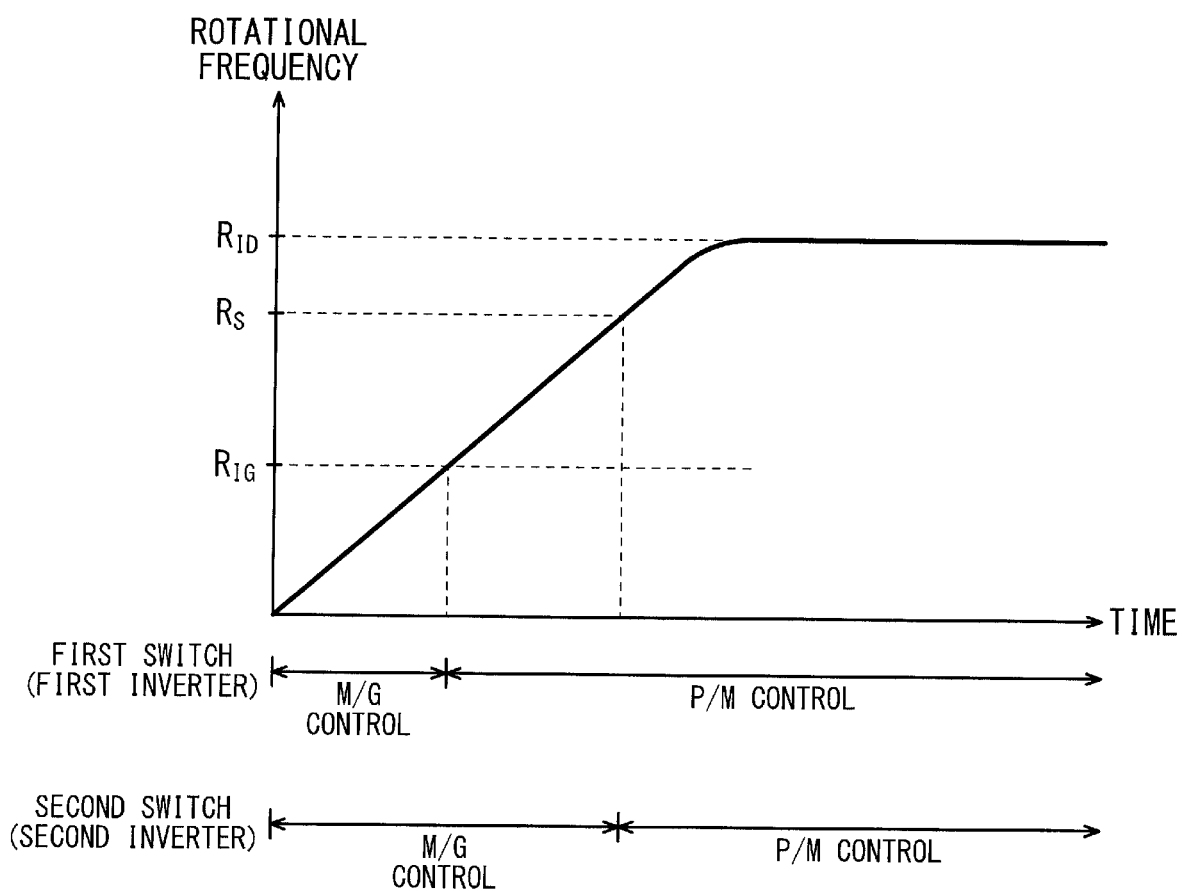
FIG. 9 is a graph showing a temporal change of the engine rotational frequency in the control shown in FIG. 8.

FIG. 8 is a flowchart for explaining the control of the auxiliary device system 201 shown in FIG. 7. FIG. 9 is a graph showing a temporal change of the engine rotational frequency in the control shown in FIG. 8. Hereinafter, the flow in FIG. 8 will be described suitably with reference to FIGS. 7 and 9. When the controller 210 receives the engine start-up command (Yes in Step S1), the controller 210 sets the first and second switches 208A and 208B to the motor generator control state to drive the motor generator 3 by the first and second inverters 207A and 207B (Step S22). At this time, the currents from the first and second inverters 207A and 207B are superposed on each other and supplied to the motor generator 3.

Next, when it is determined that the engine rotational frequency is the ignition rotational frequency $R_{IG}$ or more (No in Step S13), the controller 210 maintains the motor generator control state of the second switch 208B and switches the first switch 208A to the pump motor control state to drive the first pump driving motor 205A by the first inverter 207A (Step S24).

Next, when it is determined that the engine rotational frequency is the above-described self-sustaining rotation threshold $R_S$ or more (Yes in Step S15) since the engine 2 is ignited by the fuel supplied from the first fuel supply pump 204A and the engine rotational frequency increases, the controller 210 maintains the pump motor control state of the first switch 208A and switches the second switch 208B to the pump motor control state to drive the second pump driving motor 205B by the second inverter 207B (Step S26). The switching condition in Step S15 is not limited to the threshold determination of the self-sustaining rotation threshold $R_S$ as described in Embodiment 2.

According to the above configuration, in a period from when the engine rotational frequency has reached the rotational frequency threshold (i.e., the ignition rotational frequency $R_{IG}$) until when the ignition is completed, the fuel supply is performed by the first pump driving motor 205A while maintaining a state in which the motor generator 3 drives the engine 2. Therefore, the engine rotational frequency is prevented from decreasing in a period from when the engine rotational frequency has exceeded the threshold the ignition rotational frequency $R_{IG}$ until when the ignition is completed. On this account, the rotational frequency threshold does not have to be set to a value larger than the ignition rotational frequency $R_{IG}$, and a time it takes to start up the engine 2 can be prevented from becoming long.

Moreover, when the control of driving both the motor generator 3 and the pump driving motor 205A is continued even after the ignition of the engine, the rotation of the engine 2 can be continuously driven by the motor generator 3, and therefore, the engine rotational frequency can be increased to the self-sustaining rotation threshold $R_S$. Thus, the engine 2 can stably reach the idling rotational frequency.

Since there are plural fuel supply pumps 204A and 204B, plural pump driving motors 205A and 205B, plural inverters 207A and 207B, and plural switches 208A and 208B, redundancy of the auxiliary device system 201 can be realized. In the example of FIG. 9, the rotational frequency threshold is set to be the same as the ignition rotational frequency $R_{IG}$. However, the rotational frequency threshold may be set to a value slightly larger than the ignition rotational frequency $R_{IG}$.

REFERENCE SIGNS LIST 1, 101, 201 auxiliary device system
2 engine
3 motor generator
4, 204A, 204B fuel supply pump (auxiliary device)
5, 205A, 205B pump driving motor (auxiliary device motor)
6 converter
7, 107, 207A, 207B inverter
8, 108, 208A, 208B switch
10, 110, 210 controller

The invention claimed is:

1. An auxiliary device system of an aircraft engine, the auxiliary device system comprising:
a motor generator configured to drive an aircraft engine;
at least one auxiliary device motor configured to drive an auxiliary device mounted on the aircraft engine;
a converter configured to convert electric power generated by the motor generator;
at least one inverter provided separately from the converter and configured to drive the motor generator and the auxiliary device motor;
at least one switch configured to be switched between a motor generator control state in which the inverter controls the motor generator and an auxiliary device motor control state in which the inverter controls the auxiliary device motor; and a controller configured to control the switch, wherein:

when a condition in which a motor generator drive command has been generated is satisfied, the controller sets the switch to the motor generator control state; and when the condition is not satisfied, the controller sets the switch to the auxiliary device motor control state.

2. The auxiliary device system according to claim 1, wherein when a rotational frequency of the aircraft engine is less than a predetermined rotational frequency threshold, the controller generates the motor generator drive command.

3. The auxiliary device system according to claim 2, wherein:

the auxiliary device motor is a pump driving motor configured to drive a fuel supply pump of the aircraft engine; and the rotational frequency threshold is set to a value larger than a predetermined ignition rotational frequency of the aircraft engine.

4. The auxiliary device system according to claim 2, wherein:

the auxiliary device motor is a pump driving motor configured to drive a fuel supply pump of the aircraft engine;

the switch is configured to be switched to a simultaneous control state in which the inverter controls both the motor generator and the pump driving motor;

when the rotational frequency of the aircraft engine is less than the rotational frequency threshold, the controller sets the switch to the motor generator control state;

when the rotational frequency of the aircraft engine reaches the rotational frequency threshold, the controller switches the switch from the motor generator control state to the simultaneous control state; and after a predetermined switching condition is satisfied, the controller switches the switch from the simultaneous control state to the auxiliary device motor control state.

5. The auxiliary device system according to claim 2, wherein:

the at least one auxiliary device motor comprises first and second pump driving motors configured to respectively drive first and second fuel supply pumps of the aircraft engine;

the at least one inverter comprises first and second inverters configured to respectively drive the first and second pump driving motors;

the at least one switch comprises a first switch interposed between the first inverter and the first pump driving motor and a second switch interposed between the second inverter and the second pump driving motor;

when the rotational frequency of the aircraft engine is less than the rotational frequency threshold, the controller sets the first and second switches to the motor generator control state;

when the rotational frequency of the aircraft engine reaches the rotational frequency threshold, the controller maintains the motor generator control state of the second switch and switches the first switch from the motor generator control state to the auxiliary device motor control state; and after a predetermined switching condition is satisfied, the controller maintains the auxiliary device motor control state of the first switch and switches the second switch from the motor generator control state to the auxiliary device motor control state.

6. The auxiliary device system according to claim 5, wherein the switching condition is a condition in which the rotational frequency of the aircraft engine has reached a predetermined self-sustaining rotation threshold.

7. The auxiliary device system according to claim 2, wherein the controller generates the motor generator drive command in a period from when the aircraft engine is in a stop state until when the rotational frequency of the aircraft engine reaches the rotational frequency threshold.

\* \* \* \* \*